(12) United States Patent
Bleyer et al.

(10) Patent No.: US 10,810,753 B2
(45) Date of Patent: Oct. 20, 2020

(54) SINGLE-FREQUENCY TIME-OF-FLIGHT DEPTH COMPUTATION USING STEREOSCOPIC DISAMBIGUATION

(71) Applicant: Microsoft Technology Licensing, LLC, Redmond, WA (US)

(72) Inventors: Michael Bleyer, Seattle, WA (US); Raymond Kirk Price, Redmond, WA (US); Denis Demandolx, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 629 days.

(21) Appl. No.: 15/444,161

(22) Filed: Feb. 27, 2017

(65) Prior Publication Data

US 2018/0247424 A1    Aug. 30, 2018

(51) Int. Cl.
*G06T 7/593*    (2017.01)
*G01S 17/10*    (2020.01)
(Continued)

(52) U.S. Cl.
CPC .............. *G06T 7/593* (2017.01); *G01B 11/24* (2013.01); *G01B 11/25* (2013.01); *G01S 7/4813* (2013.01); *G01S 17/26* (2020.01); *G01S 17/36* (2013.01); *G01S 17/48* (2013.01); *G01S 17/86* (2020.01); *G01S 17/88* (2013.01); *G01S 17/89* (2013.01); *G02B 27/017* (2013.01); *G06T 7/521* (2017.01); *H04N 13/344* (2018.05); *G01S 17/66* (2013.01); (Continued)

(58) Field of Classification Search
CPC ....... G06T 7/593; G06T 7/521; G06T 19/006; G01S 7/4813; G01S 17/023; G01S 17/36; G01S 17/48; G01S 17/88; G01S 17/89; G01S 17/102; G01S 17/66; G02B 27/017; G02B 2027/0178; G01B 11/24; G01B 11/25; H04N 13/344
USPC ......................................................... 356/5.01
See application file for complete search history.

(56) References Cited

U.S. PATENT DOCUMENTS 7,791,715 B1    9/2010  Bamji
8,355,565 B1 *  1/2013  Yang ....................... G06T 7/593
                                                         382/154
(Continued)

OTHER PUBLICATIONS

Jayasuriya, et al., "Depth Fields: Extending Light Field Techniques to Time-of-Flight Imaging", In Proceedings of International Conference on 3D Vision, Oct. 19, 2015, pp. 1-9.
(Continued)

*Primary Examiner* — Daniel L Murphy
(74) *Attorney, Agent, or Firm* — Arent Fox LLP

(57) ABSTRACT

Disclosed is a technique for 3D reconstruction through a combination of time-of-flight (ToF) and stereoscopy. Use of a single modulation frequency in ToF computation provides a set of ambiguous distances. To determine a single accurate distance out of this candidate set, a stereoscopic comparison of an image pair provides a disambiguating distance. The stereoscopic comparison uses a stored virtual image of at least part of the emitted light, and the detected image of light reflected from an object. The stereoscopic distance is used to determine which of the multiple accurate distances is correct based on proximity. The closest of the multiple distances to the disambiguating distance is taken as the actual distance.

7 Claims, 8 Drawing Sheets

(51) Int. Cl.

| | | |
|---|---|---|
| *G01S 7/481* | (2006.01) | |
| *G02B 27/01* | (2006.01) | |
| *H04N 13/344* | (2018.01) | |
| *G06T 7/521* | (2017.01) | |
| *G01S 17/88* | (2006.01) | |
| *G01S 17/48* | (2006.01) | |
| *G01S 17/89* | (2020.01) | |
| *G01B 11/25* | (2006.01) | |
| *G01B 11/24* | (2006.01) | |
| *G01S 17/36* | (2006.01) | |
| *G01S 17/26* | (2020.01) | |
| *G01S 17/86* | (2020.01) | |
| *G06T 19/00* | (2011.01) | |
| *G01S 17/66* | (2006.01) | |

(52) U.S. Cl.
  CPC .... *G02B 2027/0178* (2013.01); *G06T 19/006* (2013.01)

(56) References Cited

U.S. PATENT DOCUMENTS

| | | | |
|---|---|---|---|
| 8,845,107 B1* | 9/2014 | Coley | G06T 19/20 353/28 |
| 8,878,780 B2* | 11/2014 | Chan | G02B 27/2292 345/156 |
| 9,720,232 B2* | 8/2017 | Hua | G06F 3/013 |
| 2010/0051836 A1 | 3/2010 | Kim | |
| 2011/0188028 A1 | 8/2011 | Hui et al. | |
| 2013/0100256 A1 | 4/2013 | Kirk et al. | |
| 2013/0242058 A1 | 9/2013 | Bae et al. | |
| 2014/0168369 A1 | 6/2014 | Crane et al. | |
| 2014/0211193 A1 | 7/2014 | Bloom et al. | |
| 2014/0361175 A1 | 12/2014 | Lim et al. | |
| 2015/0022545 A1 | 1/2015 | Kang et al. | |
| 2015/0062558 A1 | 3/2015 | Koppal et al. | |
| 2015/0180581 A1 | 6/2015 | Steiner et al. | |
| 2016/0005179 A1 | 1/2016 | Petyushko et al. | |
| 2016/0116594 A1 | 4/2016 | Xu et al. | |
| 2016/0124089 A1 | 5/2016 | Meinherz et al. | |
| 2016/0205378 A1 | 7/2016 | Nevet et al. | |
| 2016/0295193 A1 | 10/2016 | Van nieuwenhove et al. | |

OTHER PUBLICATIONS

Lindner, et al., "Time-Of-Flight Sensor Calibration for Accurate Range Sensing", In Journal of Computer Vision and Image Understanding, vol. 114, Issue 12, Dec. 2010, 2 pages.

"International Search Report Issued in PCT Application No. PCT/US18/019300", dated Date: Jun. 6, 2018, 15 Pages.

Zhu, et al., "Reliability Fusion of Time-of-Flight Depth and Stereo Geometry for High Quality Depth Map", In Proceedings of IEEE Transactions on Pattern Analysis and Machine Intelligence, vol. 33, Issue 7, Sep. 9, 2010, 15 pages.

* cited by examiner

SINGLE-FREQUENCY TIME-OF-FLIGHT DEPTH COMPUTATION USING STEREOSCOPIC DISAMBIGUATION

TECHNICAL FIELD

This disclosure relates to Time of Flight (ToF) depth sensing systems. More particularly, this disclosure relates to a single-frequency ToF depth computation using stereoscopic disambiguation.

BACKGROUND

Depth sensing technology can be used to determine a person's location in relation to nearby objects or to generate an image of a person's immediate environment in three dimensions (3D). An example of depth sensing technology is a time-of-flight (ToF) sensor. A ToF sensor has a light source to emit light onto nearby objects. The ToF camera can capture light reflected by surfaces of the objects. By calculating the phase of emitted light from the light source compared to the phase of reflected light returning back from an object is converted into a depth computation (i.e., distance to the object). The depth computation can be processed to map physical surfaces in the user's environment and, if desired, to render a 3D image of the user's environment. In phase-based ToF, using phase measurements from a single modulation frequency of light provides an imperfect depth computation. The phase of returned light may be used to compute an accurate measurement to within a given phase "wrap" (i.e., a wavelength) but does not provide information about the number of phase wraps between the sensor and the object from which the light was reflected. Thus, each single-frequency measurement provides multiple distances, each spaced apart by a phase wrap. One way of resolving this ambiguity involves comparison of similar distance computations from at least a second frequency of light, a process called de-aliasing.

ToF sensors and their associated illumination systems require power to operate. In mobile devices, there are often strict constraints on power consumption, as well as size, weight and cost. A ToF illumination module producing additional light emissions per frame of distance calculation results in a corresponding increase in power consumption. This issue is relevant to a number of types of devices such as depth sensing devices, active infrared (IR) modules, night vision cameras, security cameras, and other applications of machine vision. The frame rate and duration of the illumination of these systems is typically chosen to meet desired levels of accuracy at a given moment or to increase operational range of the active imaging system. Higher frame rates tend to provide higher certainty regarding the current location of objects within view of the depth sensor. A device designed to provide active illumination at a high frame rate tends to require a power source (e.g., one or more batteries) with higher capacity, and therefore more size and weight, than a device that uses a lower frame rate, thereby undesirably adding to the size, weight and cost of the end product.

SUMMARY

Introduced here is distance computation technique that transmits at one electromagnetic (EM) frequency and disambiguates that computation using a stereoscopic comparison. To generate two stereoscopic images (e.g., left and right), a structured-light pattern (e.g., of randomly positioned dots) is emitted from an EM emitter. The return (reflected) version of the structured-light pattern captured by the ToF sensor is a first image of a stereoscopic pair. A second image of the stereoscopic pair is a stored virtual image matching the original structured-light pattern. The viewpoints of the stereoscopic images may be the physical positions of the ToF sensor and the EM emitter for the first and second image, respectively. The stereoscopic distance computation is used to disambiguate between the distance computations acquired based on phase delay. Use of a single frequency capture per frame of distance computation reduces power consumption associated with depth sensing and reduces data transfer.

In some embodiments, the method can comprise first emitting EM radiation from an emitter of a device. The EM radiation is emitted from the emitter in a specified structured-light pattern. Then, a ToF sensor on the device captures a first image based on returned radiation. The returned radiation is at least a portion of the emitted EM radiation after reflecting from an object located a distance from the device. Next, the device computes the distance of the object from the device using a stereoscopic image pair. The stereoscopic image pair includes the first image detected by the ToF sensor. The second image of the stereoscopic image pair is a different variation of the EM radiation. The second image represents at least a portion of the structured-light pattern exactly as emitted by the emitter. The device stores the second image in memory so repeated detection of a second image is unnecessary.

In some embodiments, the second image is a virtual image corresponding to a virtual image sensor collocated with the emitter. Thus, the baseline distance for the stereoscopic image pair is a distance between the emitter and the ToF sensor. The method further includes computing a preliminary distance to the object based on a phase of the returned radiation. The preliminary distance includes inherent ambiguities. The stereoscopic distance disambiguates the preliminary distance.

Other aspects of the disclosed embodiments will be apparent from the accompanying figures and detailed description.

This Summary is provided to introduce a selection of concepts in a simplified form that are further explained below in the Detailed Description. This Summary is not intended to identify key features or essential features of the claimed subject matter, nor is it intended to be used to limit the scope of the claimed subject matter.

BRIEF DESCRIPTION OF THE DRAWINGS

One or more embodiments of the present disclosure are illustrated by way of example and not limitation in the figures of the accompanying drawings, in which like references indicate similar elements.

DETAILED DESCRIPTION

Figure 1:
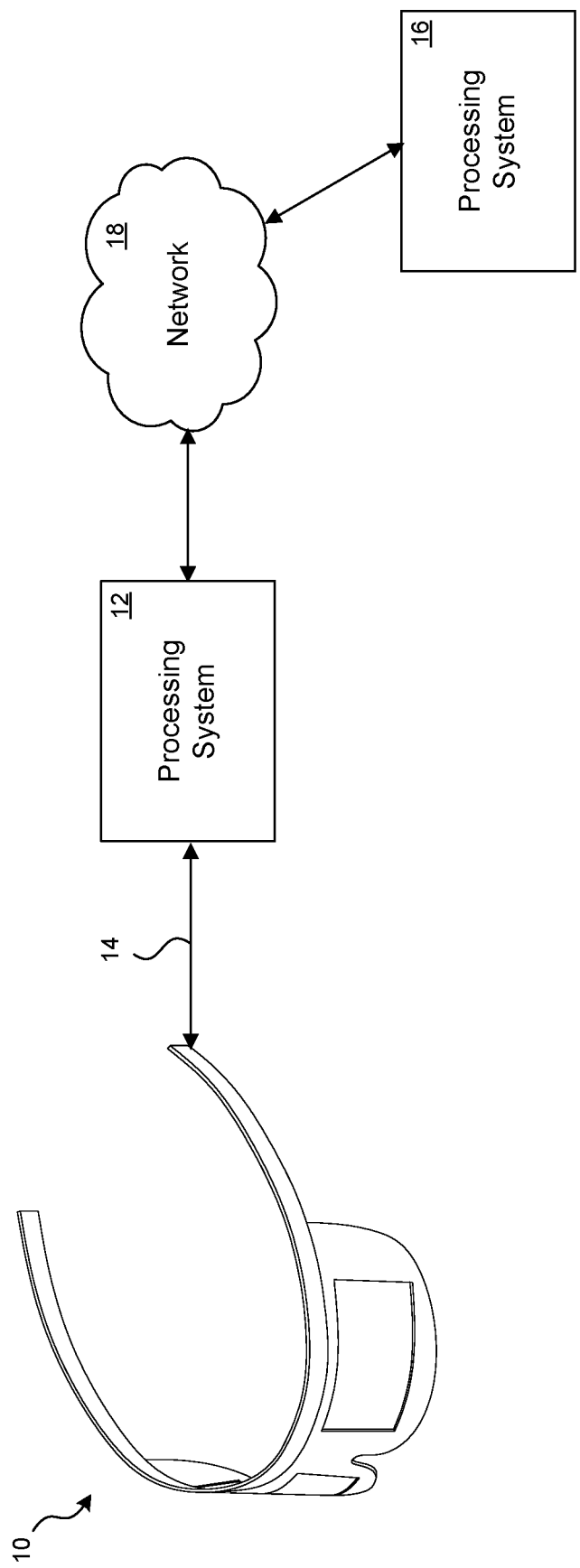
FIG. 1 shows an example of an environment in which a virtual reality (VR) or augmented reality (AR) enabled head-mounted display device (hereinafter "HMD device") can be used.

In this description, references to "an embodiment," "one embodiment" or the like mean that the particular feature, function, structure or characteristic being described is included in at least one embodiment introduced here. Occurrences of such phrases in this specification do not necessarily all refer to the same embodiment. On the other hand, the embodiments referred to also are not necessarily mutually exclusive.

The figures and related text describe certain embodiments of an illumination module suitable for use in near-to-eye display (NED) systems, such as head-mounted display (HMD) devices. However, the disclosed embodiments are not limited to NED systems and have a variety of possible applications, including any active illumination systems (i.e., actively using light sources) such as used in active light projection systems or any active camera modules. All such applications, improvements, or modifications are considered within the scope of the concepts disclosed here.

The following description generally assumes that a "user" of a display device is a human. Note, however, that a user that is not human, such as a machine or an animal, can potentially use a display device of the disclosed embodiments. Hence, the term "user" can refer to any of those possibilities, except as may be otherwise stated or evident from the context. Further, the term "optical receptor" is used here as a general term to refer to a human eye, an animal eye, or a machine-implemented optical sensor designed to detect an image in a manner analogous to a human eye.

Virtual reality (VR) or augmented reality (AR) enabled HMD devices and other NED systems may include transparent display elements that enable users to see concurrently both the real world around them and AR content displayed by the HMD devices. An HMD device may include components such as light-emission elements (e.g., light emitting diodes (LEDs)), waveguides, various types of sensors, and processing electronics. HMD devices may further include one or more imager devices to generate images (e.g., stereo pair images for 3D vision) in accordance with the environment of a user wearing the HMD device, based on measurements and calculations determined from the components included in the HMD device.

An HMD device may also include a depth sensing system that resolves distance between the HMD device worn by a user and physical surfaces of objects in the user's immediate vicinity (e.g., walls, furniture, people and other objects). The depth sensing system may include a ToF depth camera (e.g., a phase ToF depth camera) that is used to produce a 3D image of the user's nearby real-world environment. The captured image has pixel values corresponding to the distance between the HMD device and points of the real-world environment.

The HMD device may have an imager device that generates holographic images based on the resolved distances, for example, so that holographic objects appear at specific locations relative to physical objects in the user's environment. The HMD device may also have one or more display devices to display the generated images overlaid on the view of an optical receptor of a user when the HMD device is worn by the user. Specifically, one or more transparent waveguides of the HMD device can be arranged so that they are positioned to be located directly in front of each eye of the user when the HMD device is worn by the user, to emit light representing the generated images into the eyes of the user. With such a configuration, images generated by the HMD device can be overlaid on the user's three-dimensional view of the real world.

FIG. 1 schematically shows an example of an environment in which an HMD device can be used, where such HMD can implement the active illumination techniques introduced here. In the illustrated example, the HMD device 10 is configured to communicate data to and from an external processing system 12 through a connection 14, which can be a wired connection, a wireless connection, or a combination thereof. In other use cases, however, the HMD device 10 may operate as a standalone device. The connection 14 can be configured to carry any kind of data, such as image data (e.g., still images and/or full-motion video, including 2D and 3D images), audio, multimedia, voice, and/or any other type(s) of data. The processing system 12 may be, for example, a game console, personal computer, tablet computer, smartphone, or other type of processing device. The connection 14 can be, for example, a universal serial bus (USB) connection, Wi-Fi connection, Bluetooth or Bluetooth Low Energy (BLE) connection, Ethernet connection, cable connection, digital subscriber line (DSL) connection, cellular connection (e.g., 3G, LTE/4G or 5G), or the like, or a combination thereof. Additionally, the processing system 12 may communicate with one or more other processing systems 16 via a network 18, which may be or include, for example, a local area network (LAN), a wide area network (WAN), an intranet, a metropolitan area network (MAN), the global Internet, or combinations thereof.

Figure 2:
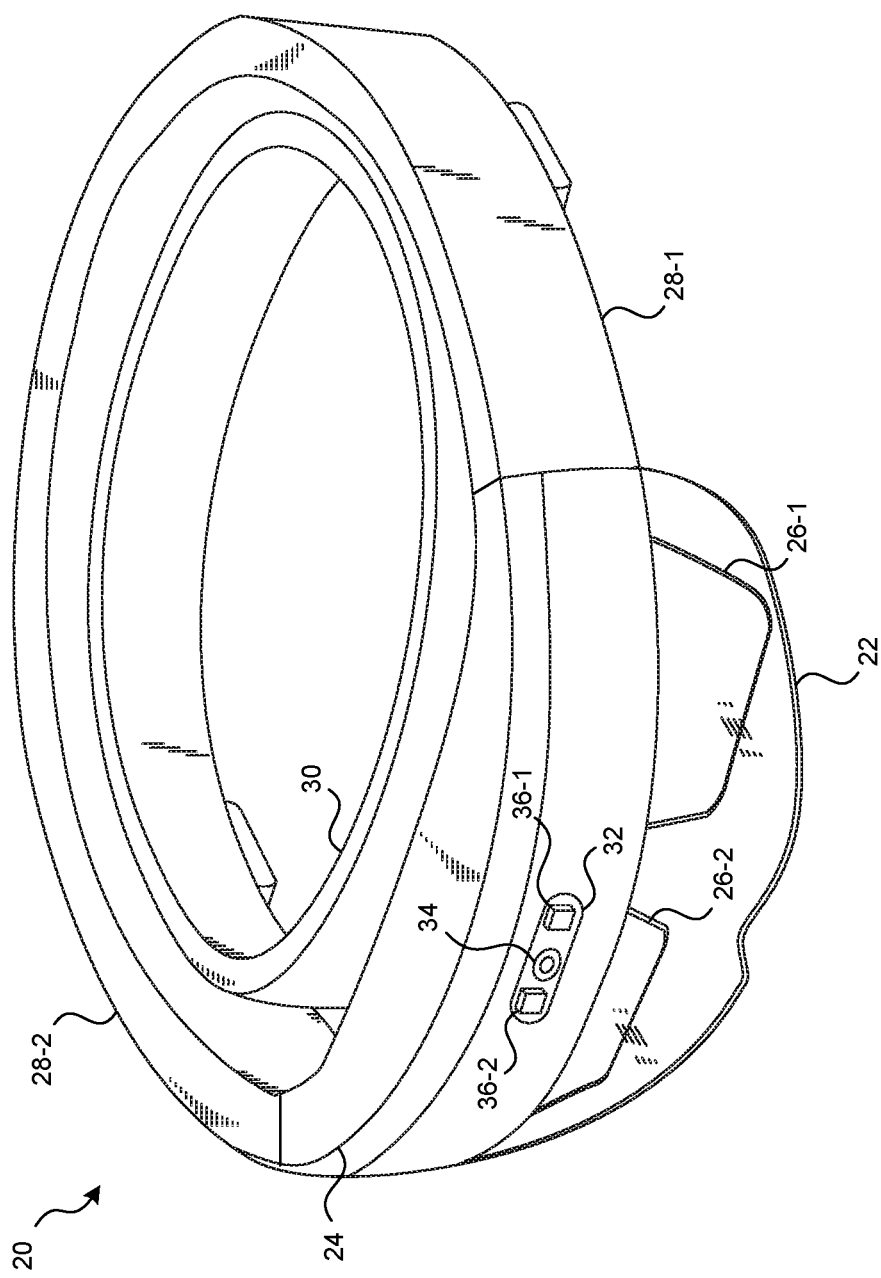
FIG. 2 illustrates a perspective view of an example of an HMD device.

FIG. 2 shows a perspective view of an HMD device 20 that can incorporate the features being introduced here, according to certain embodiments. The HMD device 20 can be an embodiment of the HMD device 10 of FIG. 1. The HMD device 20 has a protective sealed visor assembly 22 (hereafter the "visor assembly 22") that includes a chassis 24. The chassis 24 is the structural component by which display elements, optics, sensors and electronics are coupled to the rest of the HMD device 20. The chassis 24 can be formed of molded plastic, lightweight metal alloy, or polymer, for example.

The visor assembly 22 includes left and right AR displays 26-1 and 26-2, respectively. The AR displays 26-1 and 26-2 are configured to display images overlaid on the user's view of the real-world environment, for example, by projecting light into the user's eyes. Left and right side arms 28-1 and 28-2, respectively, are structures that attach to the chassis 24 at the left and right open ends of the chassis 24, respectively, via flexible or rigid fastening mechanisms (including one or more clamps, hinges, etc.). The HMD device 20 includes an adjustable headband (or other type of head fitting) 30, attached to the side arms 28-1 and 28-2, by which the HMD device 20 can be worn on the user's head.

The chassis 24 may include various fixtures (e.g., screw holes, raised flat surfaces, etc.) to which a sensor assembly 32 and other components can be attached. In some embodiments the sensor assembly 32 is contained within the visor assembly 22 and mounted to an interior surface of the chassis 24 via a lightweight metal frame (not shown). A circuit board (not shown in FIG. 2) bearing electronics components of the HMD 20 (e.g., microprocessor, memory) can also be mounted to the chassis 24 within the visor assembly 22.

The sensor assembly 32 includes a depth camera 34 and one or more associated illumination modules 36 (collectively referred to as illumination modules 36 and individually as illumination module 36-1 through 36-N) of a depth sensing system. The illumination modules 36 emit light to illuminate a nearby real-world environment. Some of the light reflects off surfaces of objects in the environment, and returns back to the depth camera 34. The depth camera 34 captures the reflected light that includes at least a portion of the light from the illumination modules 36. The depth camera may be configured to observe at multiple fields of view for different depth ranges. For a depth range configured to observe a user's hands, a field of view for the depth camera may include a 120 degree cone emanating from the depth camera.

The "light" emitted from the illumination modules 36 is electromagnetic radiation suitable for depth sensing and should not interfere with the user's view of the real world. As such, the light emitted from the illumination modules 36 is typically not part of the visible spectrum. Examples of the emitted light include infrared (IR) light to make the illumination unobtrusive. Sources of the light emitted by the illumination modules 36 may include LEDs such as superluminescent LEDs, laser diodes, or any other semiconductor-based light source with sufficient power output.

The depth camera 34 may be or include any image sensor configured to capture light emitted by the illumination modules 36. The depth camera 34 may include a lens that gathers reflected light and images the environment onto the image sensor. An optical bandpass filter may be used to pass only the light with the same wavelength as the light emitted by the illumination modules 36. For example, in a gated ToF depth sensing system, each pixel of the depth camera 34 may represent a measure of the time light has taken to travel from the illumination modules 36 to surfaces of objects and back to the depth camera 34. In contrast, in a phase delay ToF depth sensing system, each pixel of the depth camera 34 may be used to measure a phase delay of reflected light relative to the phase of light emitted from the illumination modules 36. Any of various approaches known to persons skilled in the art could be used for determining the timing, phases, phase delays, and corresponding depth calculations.

The HMD device 20 includes electronics circuitry (not shown in FIG. 2) to control and synchronize the operations of the depth camera 34 and the illumination modules 36, and to perform associated data processing functions. The circuitry may include, for example, one or more processors and one or more memories. As a result, the HMD device 20 can provide surface reconstruction to model the user's environment, or be used as a sensor to receive human interaction information, such as hand-tracking information. With such a configuration, images generated by the HMD device 20 can be properly overlaid on the user's 3D view of the real world to provide a virtual or augmented reality. Note that in other embodiments the aforementioned components may be located in different locations on the HMD device 20. Additionally, some embodiments may omit some of the aforementioned components and/or may include additional components not discussed above nor shown in FIG. 2.

Figure 3:
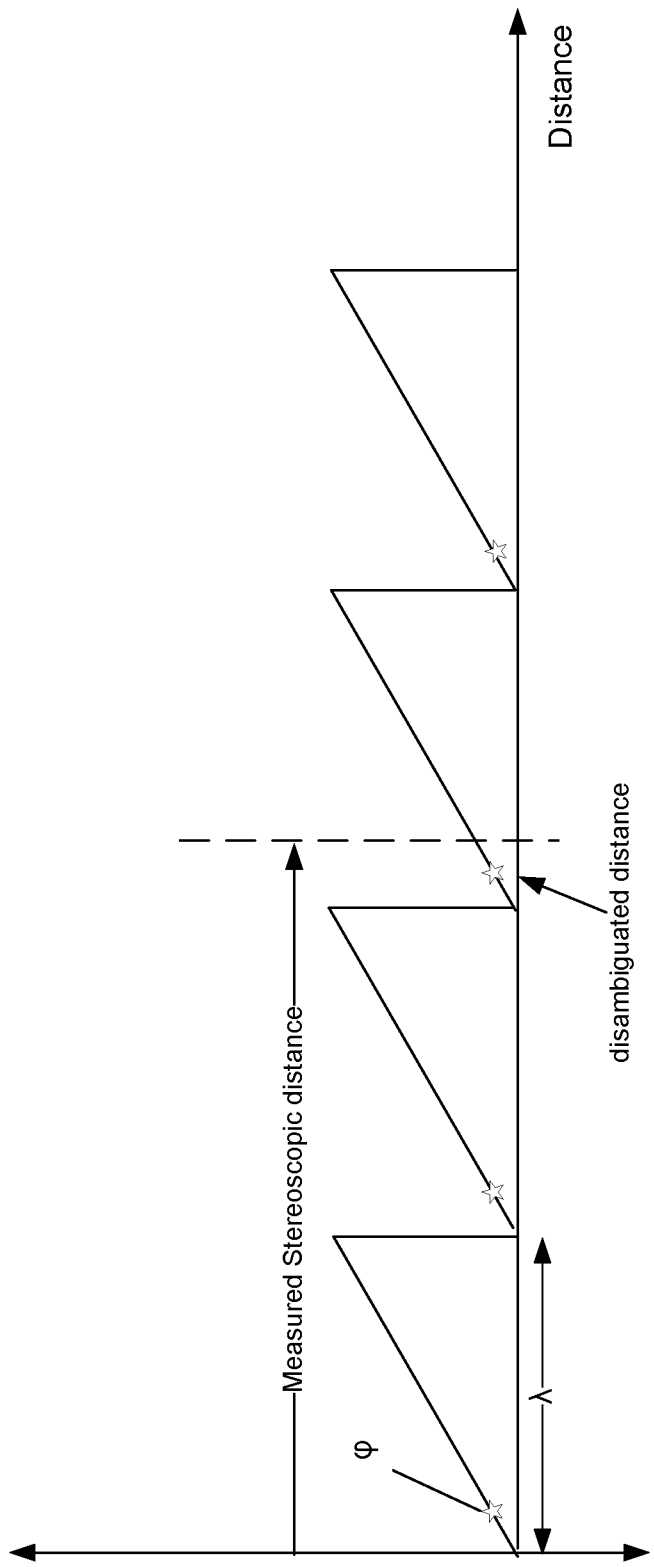
FIG. 3 is a graph illustrating depth calculation at a single frequency using stereoscopic de-aliasing.

FIG. 3 is a graph illustrating depth calculation at a single frequency by using stereoscopic de-aliasing. In particular, FIG. 3 includes a graph of a depth computation from an HMD device using a signal at a single modulation frequency and a stereoscopic depth computation. The horizontal axis of the graph tracks distance from the HMD device's illumination module. A single frequency is represented by a solid line and has a wavelength ($\lambda$). The single frequency is emitted at a phase of zero, at time zero. Star icons indicate the phase delay of the return signal (the emitted signal after it is reflected by the surface of an object). Each star icon is positioned at the same phase in each repetition of each frequency in the return signal. For each depth frame, one frequency capture is obtained. For each frequency capture a number of phase captures are obtained to determine the phase for that particular frequency.

In some embodiments of the technique introduced here, depth calculations are performed using the phase ($\varphi$) of the return signal. The phase of the return signal corresponds to a distance that is defined by a certain fraction of a signal frequency (f) divided by the speed of light. However, the phase of a return signal is a repeating distance and is therefore ambiguous. This ambiguity is also known as phase aliasing.

The ambiguity may be represent by the equation, $(\varphi_1/2\pi)(N)(f/c)=D$, where f is the frequency, c denotes the speed of light and N is a number of phase wraps. Without additional information, one cannot solve for N. Use of a second distance computation (obtained through any suitable method) enables de-aliasing calculations and provide an accurate depth based on the phase measurement. In this case, a stereoscopic distance computation is used. Due to the high accuracy of phase delay computations, the stereoscopic computation need not be extremely precise. Additionally, the lower the frequency (and therefore larger wavelength) of the single frequency is, the lower the precision requirement for the stereoscopic computation is. In general, the requirements on the stereo depth accuracy are weaker in comparison to depth sensors that only rely on stereo (i.e., no ToF). As a result, the system may employ a smaller baseline between camera and illuminator, which negatively effects stereo depth precision, but enables building a small form-factor device. Standard structured light stereo systems would perform poorly under such conditions.

The stereoscopic computation only needs to be precise enough to allow selection of one of the computed phase wraps of the single frequency (and therefore solve for "N" in the equation above). Thus, the depth tracking system may take advantage of stereoscopic computation systems that have limited functionality or precision. As depicted in FIG. 3, the stereoscopic distance computation and the phase distance computation do not match; however, the stereoscopic computation disambiguates the phase computation to the third phase wrap as the closest phase wrap to the stereoscopic computation. In practice, the two computations need not match, as long as the second distance computation is closer to one of the phase wrap computations than to the others.

Figure 4:
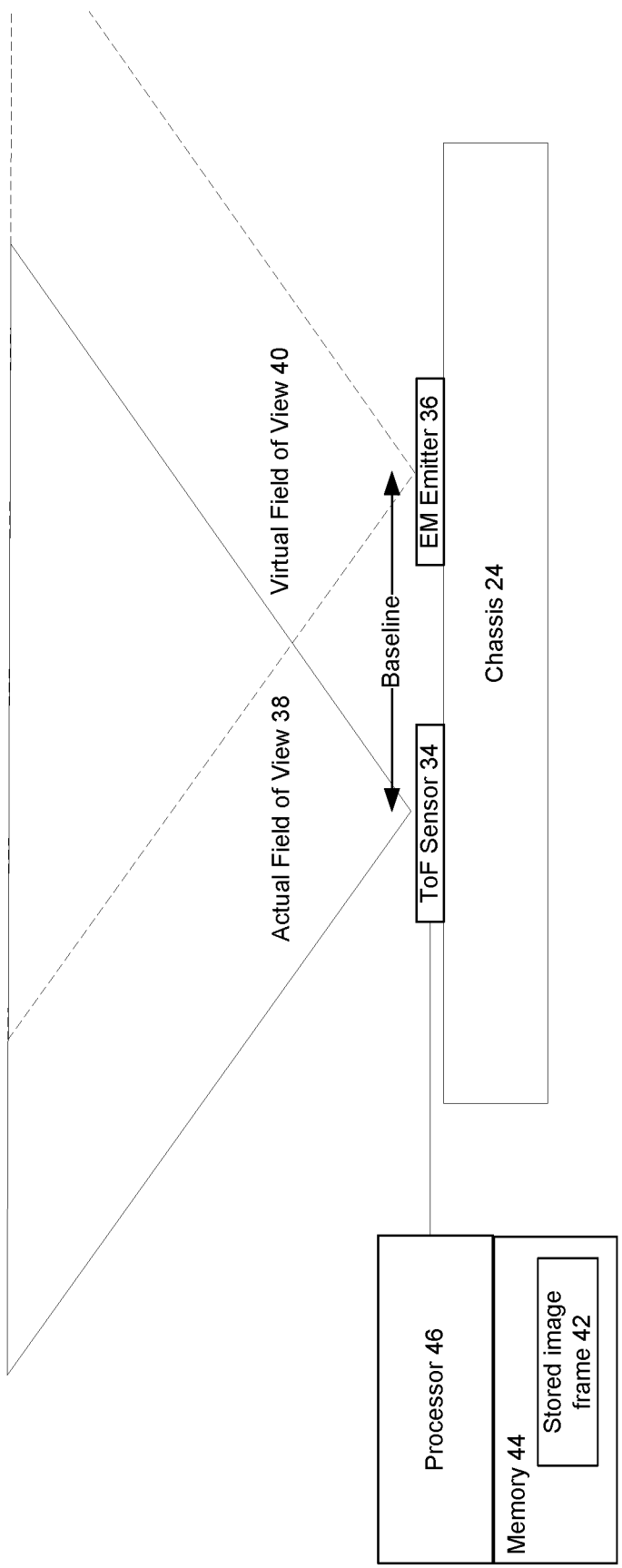
FIG. 4 is an illustration of virtual camera stereoscopic distance computation.

FIG. 4 is an illustration of virtual camera stereoscopic distance computation according to the technique introduced here. A stereoscopic distance computation makes use of at least two images that have different perspectives and that are a known distance apart ("baseline distance"). One way of obtaining these two images is to have two sensors at different, known positions capture image frames. However, the device depicted in FIG. 2 (and FIG. 4) includes a single ToF sensor 34. Other devices may also include a single camera.

FIG. 4 includes a ToF sensor 34, paired with an EM emitter 36, each mounted on a chassis 24. The ToF sensor 34 includes an actual field of view (FoV) 38 where reflected EM radiation from the EM emitter is detected. Since there is no second camera, a virtual camera provides a second image frame. The virtual camera has a virtual FoV 40. The virtual camera is collocated with the EM emitter 36, with the geometric centers of their respective FoV 40 and illumination footprint also collocated. FIG. 4 additionally includes a memory 44 and a processor 46 in communication with at least the ToF sensor 34. In some embodiments, the memory 44 and processor 46 may be mounted within the same chassis 24.

Because there is no actual camera at the EM emitter location, there is no live image frame captured at that location. Instead, a stored image 42 contained in memory/digital storage 44 is used. The stored image 42 is a depiction of the EM radiation as the EM radiation appears as emitted from the EM emitter 36. The image frame detected by the ToF sensor ("captured image frame") represents the EM radiation reflected off one or more external objects and surfaces. As a result, the captured image frame is a spatially offset version of the stored image 42. Thus, the captured image frame detected by the ToF sensor 34 and the stored image 42 record different spatial variations of the EM radiation. While the captured image frames detected by the ToF sensor 34 change and adjust as external objects shift in relative position to the ToF sensor 34, the stored image 42 remains unchanged.

To perform a stereoscopic distance computation, the processor 46 compares the captured image frame received from the ToF sensor 34 and the stored image 42 using the known locations of the ToF sensor 34 and the virtual camera (where the latter is located at the location of the EM emitter 36). The processor 46 computes a stereoscopic distance computation for each frame as well as a phase delay distance computation using the same return radiation detected by the ToF sensor 34.

A benefit of using a single frequency capture per frame is reduction of power consumption of the depth sensing system. Prior systems that use multiple frequency captures to de-alias distance computations require additional captures by the ToF sensor 34 and additional illuminations by the EM emitter 36. While de-aliasing with stereoscopy involves some power consumption through computation, this is comparatively low with respect to the power consumption savings from reduced use of sensors and emitters.

Further, having a single frequency capture per frame reduces data collection by the ToF sensor. The reduction in collected data mitigates issues with data transmissions speed. An additional benefit in using a single frequency capture per frame is to reduce motion blur. Depth sensing techniques that make use of multiple frequency captures to disambiguate may have a longer exposure time due to having to capture a larger number of images. As a result, the depth sensing may introduce motion blur into some frames. Conversely, where there is only a single frequency capture per frame, there is a reduced motion blur problem due to a smaller exposure time.

In some embodiments, the baseline distance is relatively small. The baseline may be a fraction of the size of an illumination module mounted on a HMD. The small baseline distance reduces precision of the stereographic distance computation. However, because the stereographic distance computation is used only to disambiguate distance rather than to provide an accurate distance, the stereographic computations need not be precise.

Figure 5:
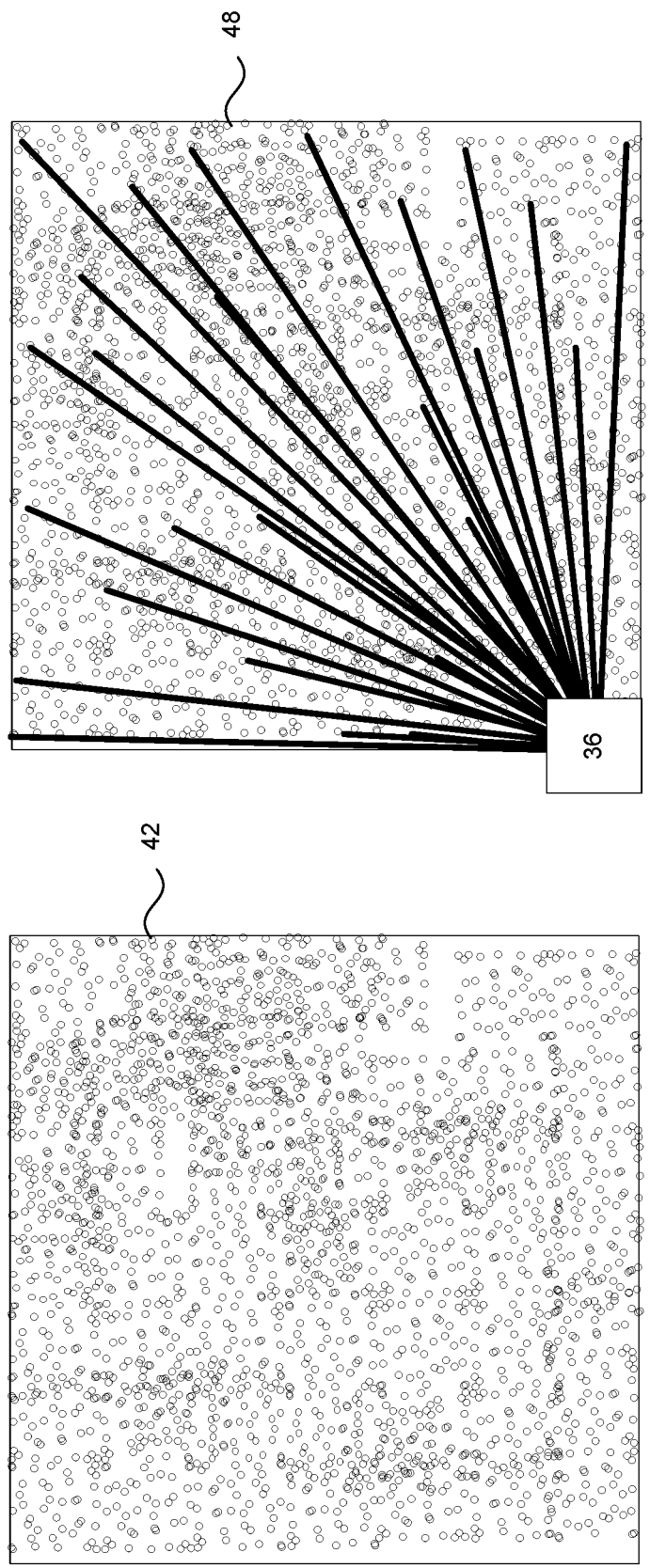
FIG. 5 is an illustration of a structured-light pattern as emitted by the EM emitter and used for stereoscopic computations.

FIG. 5 is an illustration of a structured-light pattern as emitted by the EM emitter 36 and used for stereoscopic computations. Structured-light stereo is the process of projecting a known pattern (often random dot patterns, but more regular patterns are possible too) on to a scene, or the light that forms such a pattern. For each pixel of the image recorded by the camera, the corresponding pixel position in the second image are determined via stereo matching. Once the stereo correspondences are established, depth is computed via triangulation.

The structured-light pattern depicted in FIG. 5 is a random dot pattern 48 emitted by the EM emitter 36. The stored image 42 is at least a portion of the structured-light pattern 48 exactly as emitted by the emitter 36. While a random dot pattern 48 is depicted, many other patterns are also suitable (e.g., random stripes, complex Celtic patterns, dense monotone pictures, etc. . . . ). The pattern 48 can be selected based on a number of factors such as overall coverage and variation.

Having high overall light-to object surface coverage is important in order to detect input for the largest number of pixels in each frame. A side effect of structured-light patterns is that there will not be blanket light coverage on external objects. Instead, there will be at least some areas on object surfaces that do not receive emitted light to reflect. These areas do not provide corresponding input to the ToF sensor 34. Where no radiation is emitted, the ToF sensor 34 is unable to detect corresponding reflected light, thereby creating detection gaps. Thus, having a dense structured-light pattern is important for reducing the size of detection gaps. Pixels corresponding to gaps in the illumination pattern may receive input via other methods, or inferred based on neighboring detected pixels.

The structured-light pattern 48 should also include some variation. In particular, it is important that the pattern is non-repetitive in the horizontal direction, such that it is possible to estimate a unique unambiguous stereo correspondence at every pixel. Varied patterns are those where each element of the pattern is easily discernable based on an identifiable position relative to other elements of the pattern (e.g., a random dot pattern where each dot has a random distance from surrounding dots). Greater certainty in identifying portions of the reflected EM radiation with respect to the emitted EM radiation improves overall accuracy of depth computations.

Figure 6:
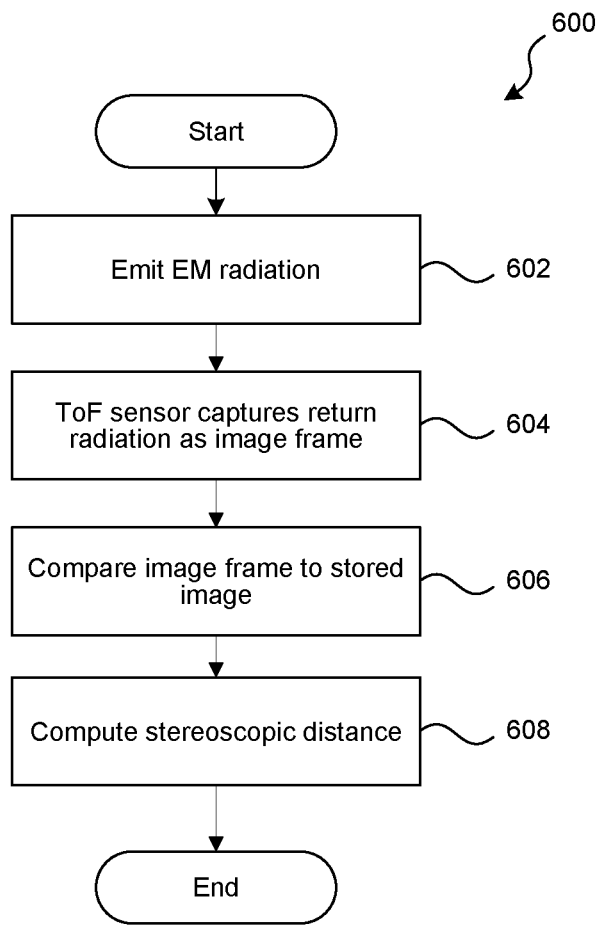
FIG. 6 is a flow chart illustrating a method of stereoscopic depth computation using a ToF sensor.

FIG. 6 is a flow chart illustrating a method of stereoscopic depth computation using a ToF sensor. In step 602, an EM emitter of a device emits EM radiation. The emission travels away from the depth tracking system and reflects off objects. At least some of the resulting reflections return to the depth tracking system and are called the "returned radiation." In some embodiments, the EM radiation is a structured-light pattern.

In step 604, a ToF sensor on the device captures an image frame based on the returned radiation. The returned radiation is at least a portion of the emitted EM radiation after having been reflected by an object located a distance from the device. Where the EM radiation is a structured-light pattern, the returned radiation is an offset version of the structured-light pattern.

Where a structured-light pattern is used, there will not necessarily be full pixel coverage in a detected image frame. Rather, the returned radiation may include gaps wherever the structured-light did not reflect from. The method is performed on a pixel-by-pixel basis, and thus, stereographic distance computations may not be computed for pixel gaps of the image frame.

In step 606, a processor of the device performs a stereographic comparison of the image frame of the returned radiation to a second image. Where the EM radiation is a structured-light pattern, the image frame is a spatially offset version of the structured-light pattern. In some embodiments, the second image is a stored image on the device. While the image frames detected by the ToF sensor change, the stored image remains unchanged. Alternatively, the second image is detected from a second camera point of view.

The stored image represents at least a portion of the structured-light pattern exactly as emitted by the emitter. Thus, a stereographic comparison between the image frame and the stored image is a comparison between emitted EM radiation and detected return radiation (as opposed to, two points of view of the returned radiation). In step 608, the processor computes a stereographic distance based on the stereographic comparison.

Figure 7:
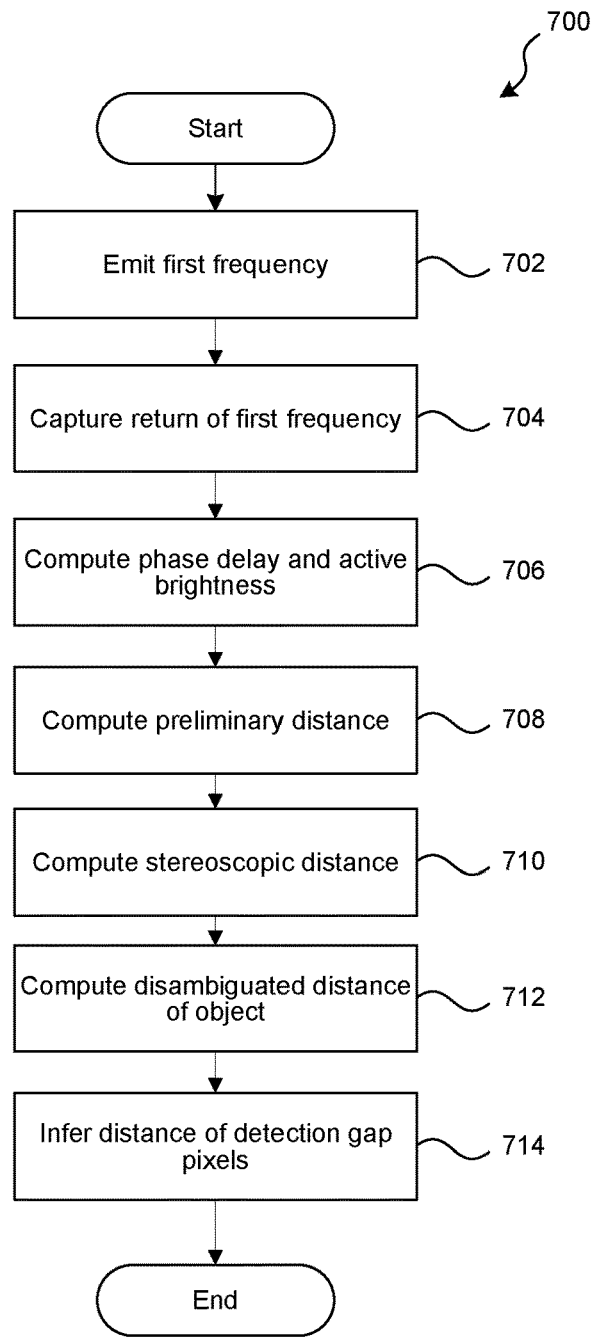
FIG. 7 is a flow chart illustrating a method of disambiguating a phase distance computation with a stereoscopic distance computation.

FIG. 7 is a flow chart illustrating a method of disambiguating a phase distance computation by use of a stereoscopic distance computation. In step 702, the EM emitter emits radiation at the first frequency. In some embodiments, the first frequency is the only frequency used in the process. The emission travels away from the depth tracking system and reflects off objects. At least some of the reflections return to the depth tracking system. In step 704, the ToF sensor captures the returned radiation of the first frequency. The returned radiation is captured on a pixel-by-pixel basis for the current frame. In step 706, the depth tracking system calculates the active brightness, and phase of the returned first frequency for the current frame. The active brightness is the magnitude of the returned radiation resulting from illumination by the EM emitter and is used to establish a correspondence between stereoscopic images and compute the stereoscopic distance. The depth tracking system compares the phase of the returned first frequency to the emitted phase to calculate a phase delay.

In step 708, the depth tracking system calculates a preliminary or estimated depth based on the phase delay and the wavelength of the first frequency. The preliminary distance has a number of values corresponding to a particular distance into a phase wrap of a variable number of phase wraps. In step 710, the depth tracking system computes a stereoscopic distance. This step is described in greater detail in FIG. 6 and the corresponding text above. In step 712, the depth tracking system computes a disambiguated distance of an object (on a pixel by pixel basis). The depth tracking system uses the stereoscopic distance computed in step 710 to solve for the variable number of phase wraps from step 708. The number of phase wraps is determined based on the number of phase wraps, at the particular distance into the phase wrap, is closest to the stereoscopic distance. Then the depth tracking system takes the disambiguated preliminary distance as the actual distance of the object.

The depth tracking system computes actual distance to the object(s) that produced the reflection on a pixel-by-pixel basis. In the case where the EM radiation is a structured-light pattern, there may not be complete coverage in the returned radiation for all pixels. In step 714, the depth tracking system infers the distance of the pixels not detected by the ToF sensor. There are a number of ways to infer missing pixels. One of these methods is to derive the shape of a detected object based on the pixels that were detected, and fill in the remaining pixels based on the derived shape. Another method is to detect a known type of object (such as a controller), and fill in pixels based on known characteristics of that object. The depth tracking system may also use other suitable methods are known in the art.

An Example Machine Overview

The machine-implemented operations described above can be implemented at least partially by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), system-on-a-chip systems (SOCs), etc.

Software or firmware to implement the embodiments introduced here may be stored on a machine-readable storage medium and may be executed by one or more general-purpose or special-purpose programmable microprocessors. A "machine-readable medium," as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Figure 8:
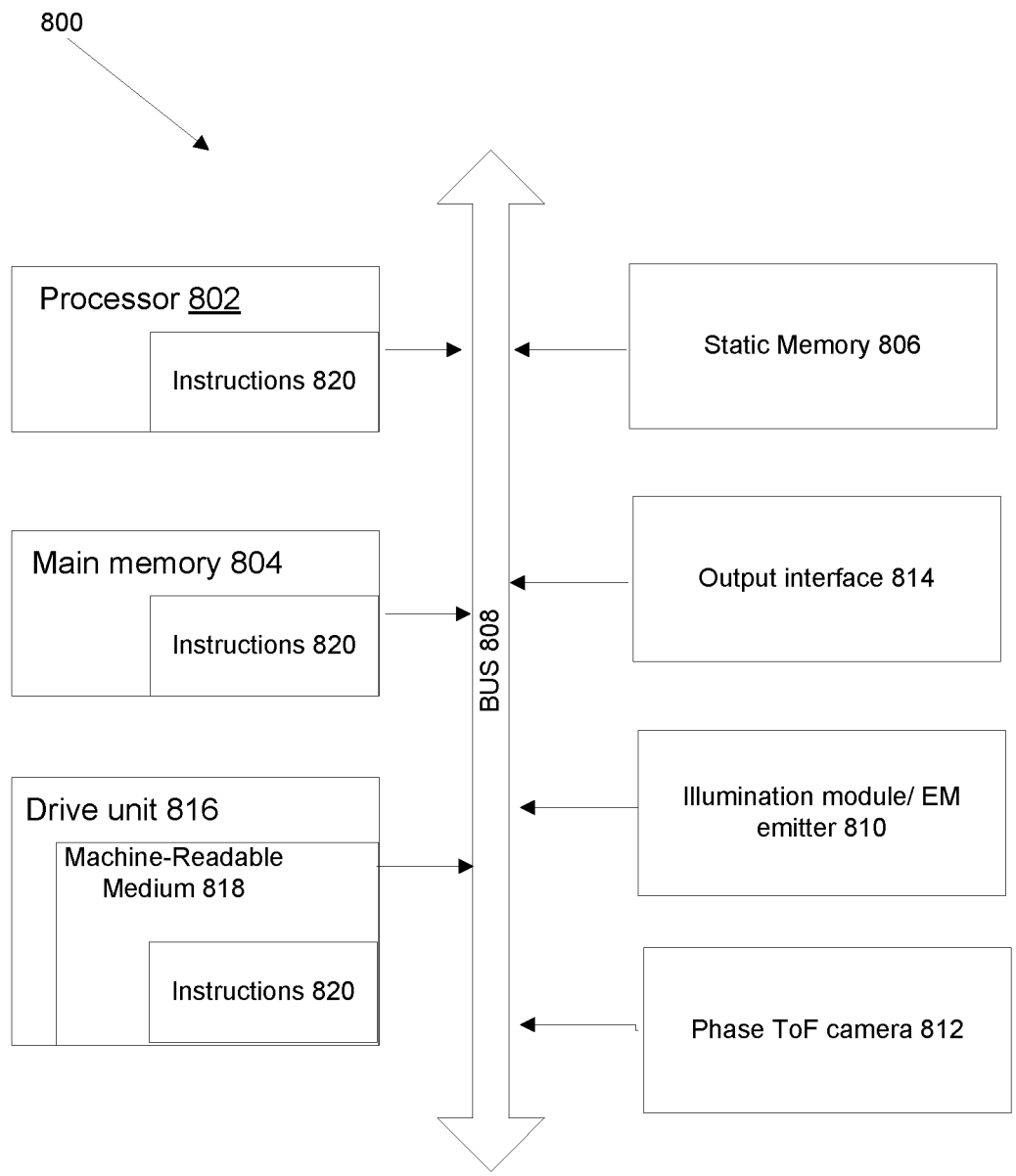
FIG. 8 is a block schematic diagram of a system in the exemplary form of a computer system within which a set of instructions for causing the system to perform any one of the foregoing methodologies and logical flows may be executed.

FIG. 8 is a block schematic diagram of a system in the illustrative form of a computer system 800 within which a set of instructions for causing the system to perform any one of the foregoing methodologies and logical flows may be executed. In alternative embodiments.

The computer system 800 includes a processor 802, a main memory 804 and a static memory 806, which communicate with each other via a bus 808. The computer system 800 further includes an illumination module 810 and a phase ToF camera 812. The computer system 800 also includes an output interface 814, for example, a USB interface, a network interface, or electrical signal connections and/or contacts;

The disk drive unit 816 includes a machine-readable medium 818 on which is stored a set of executable instructions, i.e. software 820, embodying any one, or all, of the methodologies described herein. The software 820 is also shown to reside, completely or at least partially, within the main memory 804 and/or within the processor 802. The software 820 may further be transmitted or received over a network by means of a network interface device 814.

In contrast to the system 800 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a system or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Further, it is to be understood that embodiments may include performing operations and using storage with cloud computing. For the purposes of discussion herein, cloud computing may mean executing algorithms on any network that is accessible by internet-enabled or network-enabled devices, servers, or clients and that do not require complex hardware configurations, e.g. requiring cables and complex software configurations, e.g. requiring a consultant to install. For example, embodiments may provide one or more cloud computing solutions that enable users, e.g. users on the go, to access real-time video delivery on such internet-enabled or other network-enabled devices, servers, or clients in accordance with embodiments herein. It further should be appreciated that one or more cloud computing embodiments include real-time video delivery using mobile devices, tablets, and the like, as such devices are becoming standard consumer devices.

EXAMPLES OF CERTAIN EMBODIMENTS

1. A method comprising: emitting electromagnetic (EM) radiation from an emitter of a device; capturing, by a ToF sensor on the device, a first image based on returned radiation, wherein the returned radiation is at least a portion of the emitted EM radiation after said at least a portion of the emitted EM radiation has been reflected by an object located a distance from the device; and computing the distance of the object from the device by using a stereoscopic image pair that includes the first image.

2. The method of example 1, wherein the stereoscopic image pair further includes a second image, and wherein the first and second images record different variations of the EM radiation.

3. The method of example 1 or example 2, wherein the EM radiation is emitted from the emitter in a specified structured-light pattern.

4. The method of any of examples 1 to 3, wherein the second image represents at least a portion of the structured-light pattern exactly as emitted by the emitter, the method further comprising: storing the second image in a memory of the device prior to said emitting.

5. The method of any of examples 1 to 4, wherein the second image is a virtual image corresponding to a virtual image sensor collocated with the emitter, and wherein a baseline distance for the stereoscopic image pair is a distance between the emitter and the ToF sensor.

6. The method of any of examples 1 to 5, wherein the distance of the object is a first distance measured by stereoscopy, the method further comprising: computing a preliminary distance to the object based on a phase of the returned radiation; and computing a disambiguated distance to the object based on the preliminary distance and the first distance.

7. The method of any of examples 1 to 6, wherein the EM radiation is infrared light.

8. A method comprising: transmitting electromagnetic (EM) radiation from an emitter of a device configured to determine a distance from the device to an object, over a wireless medium; capturing, by a ToF sensor on the device, a first image based on returned radiation, returned radiation is at least a portion of the emitted EM radiation after said at least a portion of the emitted EM radiation has been reflected by an object located a distance from the device; and computing an ambiguous distance to the object based on a phase of the returned radiation; and computing a de-aliased distance from the device to the object from the preliminary distance using stereoscopy based on a stereoscopic image pair that includes the first image and a second image, the second image stored in a memory of the device and representing at least a portion of the EM radiation exactly as emitted by the emitter.

9. The method of example 8, wherein the EM radiation is infrared light.

10. The method of example 8 or example 9, wherein the EM radiation is emitted by the emitter in a structured-light pattern.

11. The method of any of examples 8 to 10, wherein the returned radiation includes a spatially offset structured-light pattern and said computing a de-aliased distance further comprises: computing an estimated distance based upon a stereoscopic comparison of the first image and the second image; based on the phase of the returned radiation and a frequency of the EM radiation determining a number of phase wraps of the returned radiation that are the closest to the estimated distance; and outputting a de-aliased distance based on the number of phase wraps and the phase of the returned radiation.

12. The method of any of examples 8 to 10, wherein the second image represents at least a portion of the structured-light pattern exactly as emitted by the emitter, the method further comprising: storing the second image in a memory of the device prior to said emitting.

13. The method of any of examples 8 to 12, wherein the second image is a virtual image corresponding to a virtual image sensor collocated with the emitter, and wherein a baseline distance for the stereoscopic image pair is a distance between the emitter and the ToF sensor.

14. The method of any of examples 8 to 13, wherein said de-aliasing further comprises: determining an active brightness of the returned radiation comparing an illumination power of the EM radiation to the active brightness of the returned radiation.

15. The method of any of examples 8 to 14, wherein said transmitting EM radiation comprises transmitting the EM radiation at only one frequency.

16. The method of any of examples 8 to 15, wherein the device is a near-eye display device.

17. An apparatus comprising: an electromagnetic (EM) emitter configured to emit EM radiation to determine a distance from the apparatus to an object, over a wireless medium at one frequency; a time-of-flight (ToF) sensor configured to capture a first frame of returned radiation that is at least a portion of emitted EM radiation after said at least a portion of emitted EM radiation has been reflected by an object located a distance from the apparatus; and a processor configured to compute a first distance to the object using a stereoscopic image pair that includes the first frame.

18. The apparatus of example 17, wherein the first frame further includes a phase of the returned radiation and wherein the processor is further configured to compute an ambiguous distance based on the phase of the returned radiation and de-alias the ambiguous distance using first distance.

19. The apparatus of example 17 or example 18, further comprising: a memory storing a second frame and a mapped stereographic position, the second frame is a virtual image corresponding to a virtual image sensor located at the mapped stereographic position.

20. The apparatus of any of examples 17 to 19, further comprising: a housing shaped to allow the apparatus to be worn on a user's head as at least a portion of a head-mounted display device.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and that (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A method comprising:
   emitting, by an emitter of a device, electromagnetic (EM) radiation in a structured light pattern toward an object;
   capturing, by a time of flight sensor on the device, as first image data a portion of the emitted EM radiation reflected off the object;
   computing, by the device, a set of aliased phase delay distances between the device and the object using the first image data;
   computing, by the device, a stereoscopic distance between the device and the object using 1) the first image data, and 2) a stored image frame comprising a non emitted and non-captured version of the structured light pattern, wherein the stored image frame is a depiction of the EM radiation as emitted from the emitter; and
   determining, by the device, a distance between the device and the object by de-aliasing the set of aliased phase delay distances using the computed stereoscopic distance.

2. The method of claim 1, wherein a baseline distance for the stereoscopic distance is a distance between the imputed location and the ToF sensor.

3. The method of claim 1, wherein the EM radiation is infrared light.

4. The method of claim 1, wherein said de-aliasing further comprises:
   determining an active brightness of the returned radiation; and
   comparing an illumination power of the EM radiation to the active brightness of the returned radiation.

5. The method of claim 1, wherein the device is a near-eye display device.

6. An apparatus comprising:
   an electromagnetic (EM) emitter configured to emit EM radiation toward an object;
   a time-of-flight (ToF) sensor configured to capture as first image data a portion of emitted EM radiation reflected off the object; and
   a processor configured to:
     compute a set of aliased phase delay distances between the device and the object using the first image data;
     compute a stereoscopic distance between the device and the object using 1) the first image data, and 2) a stored image frame comprising a non-emitted and non-captured version of the emitted EM radiation, wherein the stored image frame is a depiction of the EM radiation as emitted from the emitter; and
     determine a distance between the device and the object by de-aliasing the set of aliased phase delay distances using the computed stereoscopic distance.

7. The apparatus of claim 6, further comprising:
   a housing shaped to allow the apparatus to be worn on a user's head as at least a portion of a head-mounted display device.

* * * * *